UNITED STATES PATENT OFFICE.

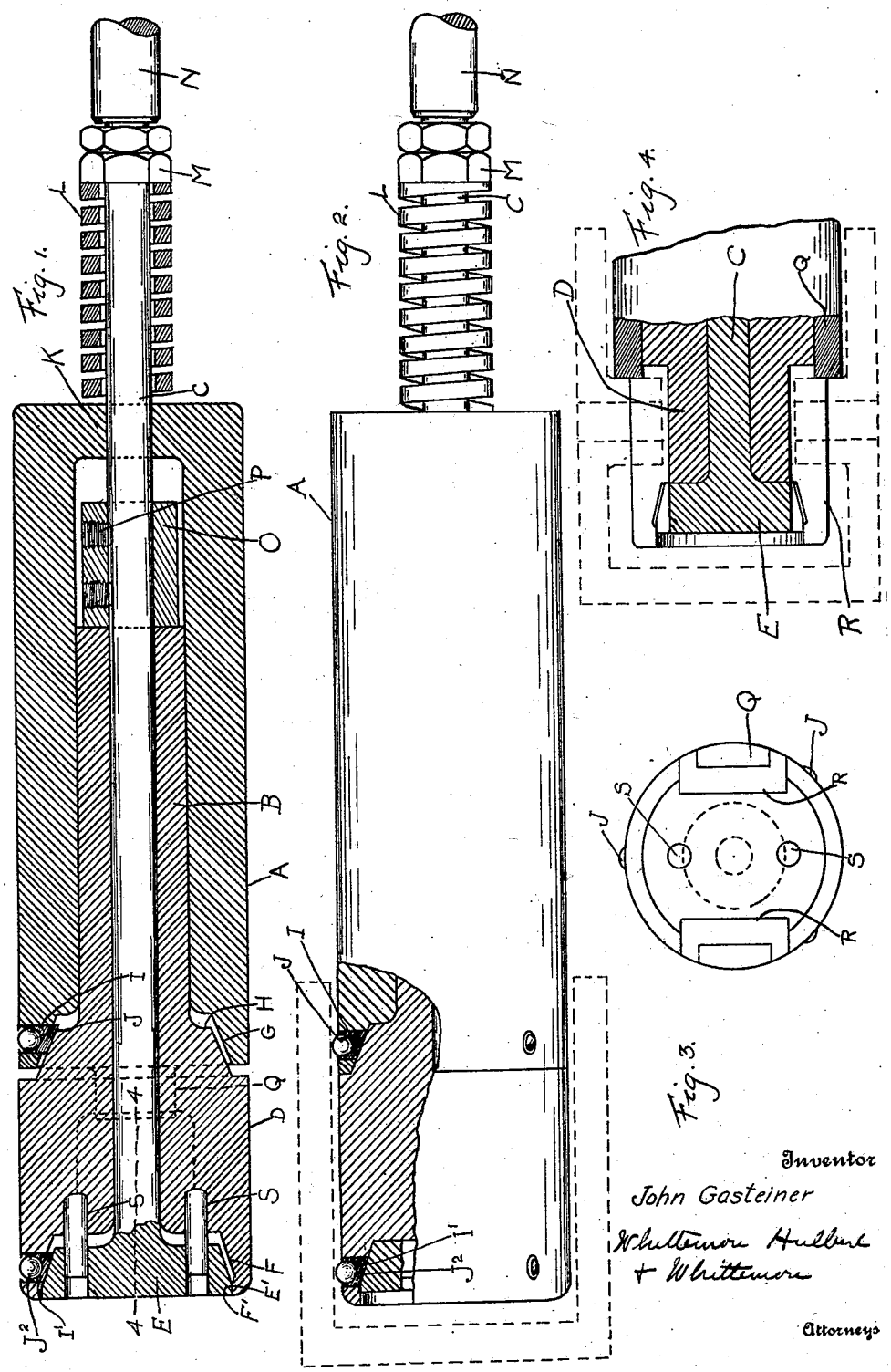

JOHN GASTEINER, OF DETROIT, MICHIGAN.

INTERNAL CHUCK.

1,407,145.                  Specification of Letters Patent.        Patented Feb. 21, 1922.

Application filed March 19, 1920. Serial No. 367,189.

*To all whom it may concern:*

Be it known that I, JOHN GASTEINER, a citizen of the United States of America, residing at Detroit, in the county of Wayne and State of Michigan, have invented certain new and useful Improvements in Internal Chucks, of which the following is a specification, reference being had therein to the accompanying drawings.

This invention relates to internal chucks and more particularly to internal chucks of the type providing an axially slidable tapered head for radially shifting a series of clutch members surrounding said head.

It is the object of the invention to provide yieldable means tending to maintain the radially movable clutch members of an internal chuck constantly expanded and to make suitable provision for overcoming said yieldable means to allow engagement of the work with the chuck and its removal therefrom. Another object of the invention is to provide radially acting clutch members of a spherical form so as to insure an accurate centering of the work with respect to the axis of the chuck and to provide furthermore for ready replacement of the clutch members when worn.

Still another object is to provide an internal chuck having two spaced series of clutch members and making provision for successively disengaging the respective series from the work.

The invention consists in the structural features and arrangements of parts hereinafter fully described and illustrated in the accompanying drawings; wherein, Figure 1 is an axial sectional view of the improved chuck, the clutch members thereof being shown retracted;

Figure 2 is a view of the same in elevation with certain parts broken away to disclose that the clutch members are in projected position;

Figure 3 is an end view of the chuck;

Figure 4 is a sectional view thereof on line 4—4 of Fig. 1.

In these views the reference character A designates the cylindrical casing of the chuck, B a sleeve fitting within said casing and C a stem passing axially through the casing within the sleeve B. Forward of the casing A there is integrally formed upon the sleeve B a head D of substantially the same diameter as said casing. Forwardly of said head there is integrally formed upon the stem C a relatively small head E which is conically tapered and adapted to engage within a correspondingly shaped socket F formed in the front end face of the head D. Adjacent its mouth, the socket F has a cylindrical portion F', in which a correspondingly shaped portion E' of the head E has a slip fit. Thus, such strains as act inwardly upon said head are transmitted to the larger head D rather than to the relatively weak stem C. A similar socket G is formed in the front end face of the casing A and is adapted to be engaged by a correspondingly tapered boss H formed integrally with the head D at its juncture with the sleeve B. A radially slidable series of clutch members I is mounted in the casing A in circumferentially spaced relation, said members projecting at their inner ends into the socket G and being bevelled in substantial parallelism with the conically tapered boss H so as to be outwardly shifted by the latter as it enters the socket G. Each of said clutch members loosely carries a ball J of hardened steel which projects outwardly beyond the peripheral face of the casing A and is engageable with the work (indicated in dash line in Fig. 2) when the members I are outwardly shifted. A similar series of clutch members I' and corresponding steel balls $J^2$ is mounted in the head D for actuation radially by the head E when the latter is retracted into the socket F.

At its rear end the casing A forms a slide bearing K for a stem C, and a spring L, coiled upon a portion of said stem projecting rearwardly beyond the casing, is compressed between the casing and a nut M upon the end of said stem, said spring thus tending to actuate the stem C rearwardly drawing the head E into the socket F and the boss H into the socket G, so as to maintain both sets of clutch members I and I' normally in their projected work-engaging positions. N is a plunger aligned with the stem B and adapted to be actuated by a mechanism (not shown) to exert an axial thrust upon said stem to thereby withdraw the head E from the socket F and the boss H from the socket G, so as to permit a retraction of the radially acting clutch members. To transmit the thrust of the plunger N to the sleeve B as well as to the stem C, there is mounted upon said stem within the casing A a collar O which is adapted to be longitudinally adjusted upon the stem by one or more set screws P. When the plunger N is disengaged from the stem C allowing the spring L to shift the head E and boss H into their respective sockets F and G, the collar O occupies a slightly spaced relation to the rear end of the sleeve B. By virtue of the clearance space thus provided, when the plunger N is applied to the stem C to shift the latter forwardly the sleeve B remains stationary during the initial forward movement of said stem, so that the advance set of clutch members I' are first relieved of the outward thrust of the head E and, subsequently, after the collar O has engaged sleeve B and the latter is shifted in unison with the stem the rearward set of clutch members I are relieved from the thrust of the boss H. It is to be understood that the casing A may be engaged with the rotative holder or adapter of any rotary machine, as for example a lathe or boring mill. The rotation of the casing A is communicated to the head D by an interlock formed by a pair of diametrically opposed tongues Q upon the casing A projecting into suitable slots in the head D. Preferably both of the heads E and D are formed with registering channels R at diametrically opposed sides thereof to accommodate the bosses which are commonly formed interiorly of a piston to engage the wrist pin thereof, and to prevent relative turning of said heads and a consequent disturbance of the registering relation of the portions of the channels R formed respectively in said heads, a pair of pins S are mounted in the head D and engaged in suitable sockets in the head E.

It is to be noted that the described chuck is self-adjusting to take care of any inequality between the interior diameters of the work at its points of engagement between forward clutch members I' and the rear clutch members I since either set of clutch members may continue to be expanded after the other set has been stopped by engagement with the interior face of the work. This provision for differential expansion is highly desirable in many cases where the internal diameter of the work is not constant throughout the length of the work, this being frequently true of pistons. It is further to be observed that the employment of the spring L to subject the clutch members to a radial outward thrust insures a constant power for said outward thrust, which power may be initially predetermined, so that in case of an excessive resistance being offered by the work, the clutch members may slip thereon, rather than break as must be the case in structures employing merely plungers in place of ball members.

The described clutch is applicable for use with any kind of work requiring to be internally engaged by a rotative drive, and is especially adapted for use in machining engine pistons.

What I claim as my invention is:

1. An internal chuck comprising a casing having a tapered socket at one end thereof, a series of radially slidable members mounted in said casing and extending into said socket, a sleeve within said casing, a head upon said sleeve at one end of the casing having a tapered portion adapted to engage said socket to deflect said clutch members outwardly, a rod mounted in said sleeve, a head upon one end of said rod conically tapered to engage in a correspondingly shaped socket in the first mentioned head, a series of clutch members mounted in the head carried by the sleeve and adapted to project into said socket and engageable by the head on the stem to deflect said clutch members outwardly, and actuating means for said stem and sleeve.

2. An internal chuck comprising a cylindrical casing provided with a tapered socket at one end thereof, a sleeve slidable within said casing formed with a head at one end of said casing, said head having a tapered portion for engagement in said socket, a plurality of radially movable clutch members carried by the casing and adapted to project into said socket, said members being outwardly deflected by the tapered portion of said head when the same is engaged in said socket, a stem slidable in said sleeve, a tapered head upon said stem engageable in a correspondingly shaped socket formed in said head on the sleeve, a plurality of radially movable clutch members carried by the head on the sleeve and adapted to project into the socket on said head, said members being outwardly deflected by the head on the stem when the latter is engaged in its socket, a spring normally acting upon said sleeve and stem to engage said tapered portion and head in the corresponding sockets, and means for shifting said stem and sleeve in opposition to said spring.

3. An internal chuck comprising a cylindrical casing, a sleeve slidable within said casing, a stem slidable in said sleeve, a head carried by said sleeve adjacent the casing, a second head carried by the stem adjacent the first-mentioned head, two series of radially movable clutch members respectively carried by the casing and by the head on the sleeve, said clutch members on the casing being outwardly actuable by the head on the sleeve through a sliding movement of said sleeve, and the clutch members on the head carried by the sleeve being outwardly actuable by the head on the stem through a corresponding sliding movement of said stem.

4. An internal chuck comprising a cylindrical casing, a sleeve slidable within said casing, a stem slidable in said sleeve, a head carried by said sleeve adjacent the casing, a second head carried by the stem adjacent the first-mentioned head, two series of radially movable clutch members respectively carried by the casing and by the head on the sleeve, said clutch members on the casing being outwardly actuable by the head on the sleeve through a sliding movement of said sleeve, and the clutch members on the head carried by the sleeve being outwardly actuable by the head on the stem through a corresponding sliding movement of said stem, means for communicating a drive from the casing to the head on the sleeve, and means for communicating a drive from the head on the sleeve to the head on the stem.

5. An internal chuck comprising a casing, a series of slidable clutch members mounted in said casing, a sleeve slidable longitudinally in said casing, a head upon said sleeve at one end of the casing engageable with said clutch members to deflect the same outwardly upon a longitudinal movement of the sleeve, a series of clutch members radially slidable in said head carried by the sleeve, a rod mounted in said sleeve, a head upon one end of said rod engageable with the last mentioned series of clutch members to actuate the same outwardly, and means for longitudinally shifting said rod and sleeve.

In testimony whereof I affix my signature.

JOHN GASTEINER.